US011261379B1

(12) United States Patent
Haustead

(10) Patent No.: US 11,261,379 B1
(45) Date of Patent: Mar. 1, 2022

(54) FIRE-RETARDANT POTTING COMPOUND FOR BACKLIT DEVICES

(71) Applicant: B/E Aerospace, Inc., Winston-Salem, NC (US)

(72) Inventor: Richard C. Haustead, Swanmore (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 24 days.

(21) Appl. No.: 16/549,998

(22) Filed: Aug. 23, 2019

(51) Int. Cl.
*C09K 21/02* (2006.01)
*C08K 3/22* (2006.01)
*B64D 45/00* (2006.01)

(52) U.S. Cl.
CPC .............. *C09K 21/02* (2013.01); *B64D 45/00* (2013.01); *C08K 3/22* (2013.01); *C08K 2003/2227* (2013.01)

(58) Field of Classification Search
CPC .. C09K 21/02; C08K 3/22; C08K 2003/2227; B64D 45/00
See application file for complete search history.

(56) References Cited

U.S. PATENT DOCUMENTS

| 5,883,160 A | 3/1999 | Kikuchi et al. |
| 8,288,455 B1 | 10/2012 | Miller |
| 2021/0061986 A1* | 3/2021 | Kang .................. C08K 5/5419 |

FOREIGN PATENT DOCUMENTS

| DE | 102010022523 | 9/2017 |
| WO | 2020131946 A1 | 6/2020 |

OTHER PUBLICATIONS

Extended Search Report for European Application No. 20192440.4 dated Feb. 1, 2021, 9 pages.
Okada Yet al: "New highly reliable heat resistant magnet wire and epoxy potting compound system for electrical devices", 19890925; 19890925-19890928, Sep. 25, 1989 (Sep. 25, 1989), pp. 284-288, XP010090529.

* cited by examiner

*Primary Examiner* — Andrew J. Oyer
(74) *Attorney, Agent, or Firm* — Suiter Swantz pc llo

(57) ABSTRACT

A fire-retardant potting compound for a backlit device is disclosed. The fire-retarding potting compound includes a white resin, an Aluminum Trihydroxide powder, and a hardener mixed together. The fire-retardant potting compound may be applied to a panel of a backlit device, in between a light source and one or more transmissive features of the panel.

8 Claims, 4 Drawing Sheets

FIRE-RETARDANT POTTING COMPOUND FOR BACKLIT DEVICES

BACKGROUND

A backlit device may include a potting compound that protects portions of the device (e.g., electrical components) from liquid, dust, shock, vibrations, etc. The potting compound may also be used to achieve a more even light distribution. However, some potting compound formulations are more likely to trap heat and/or catch fire. Accordingly, there is a need for potting compound formulations that meet thermal conductivity and fire-retardant requirements for critical applications. For example, a potting compound for backlit devices within an aircraft cabin may be required to satisfy the Federal Aviation Regulations (FAR) 25.8.53 test criteria.

SUMMARY

A fire-retardant potting compound for a backlit device is disclosed. In one or more embodiments, the fire-retarding potting compound includes a white resin, an Aluminum Trihydroxide powder, and a hardener mixed together. The fire-retardant potting compound may be applied to a panel of a backlit device, in between a light source and one or more transmissive features of the panel.

In some embodiments, the white resin constitutes approximately 30-35% of the fire-retardant potting compound by mass.

In some embodiments, the Aluminum Trihydroxide powder constitutes approximately 55-60% of the fire-retardant potting compound by mass.

In some embodiments, the hardener constitutes approximately 5-10% of the fire-retardant potting compound by mass.

In some embodiments, the white resin constitutes approximately 32% of the fire-retardant potting compound by mass, the Aluminum Trihydroxide powder constitutes approximately 60% of the fire-retardant potting compound by mass, and the hardener constitutes approximately 8% of the fire-retardant potting compound by mass.

In some embodiments, the one or more transmissive features are one or more openings defined within the panel.

In some embodiments, the backlit device is a light fixture.

In some embodiments, the backlit device is a user interface device.

A method of producing a fire-retardant potting compound for a backlit device is also disclosed. In one or more embodiments, the method includes mixing an Aluminum Trihydroxide powder into a white resin to form a first mixture; and mixing a hardener into the first mixture to form the fire-retardant potting compound.

In some embodiments, the first mixture is agitated for at least two minutes before mixing the hardener into the first mixture.

In some embodiments, the fire-retardant potting compound is agitated for at least three minutes after mixing the hardener into the first mixture.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
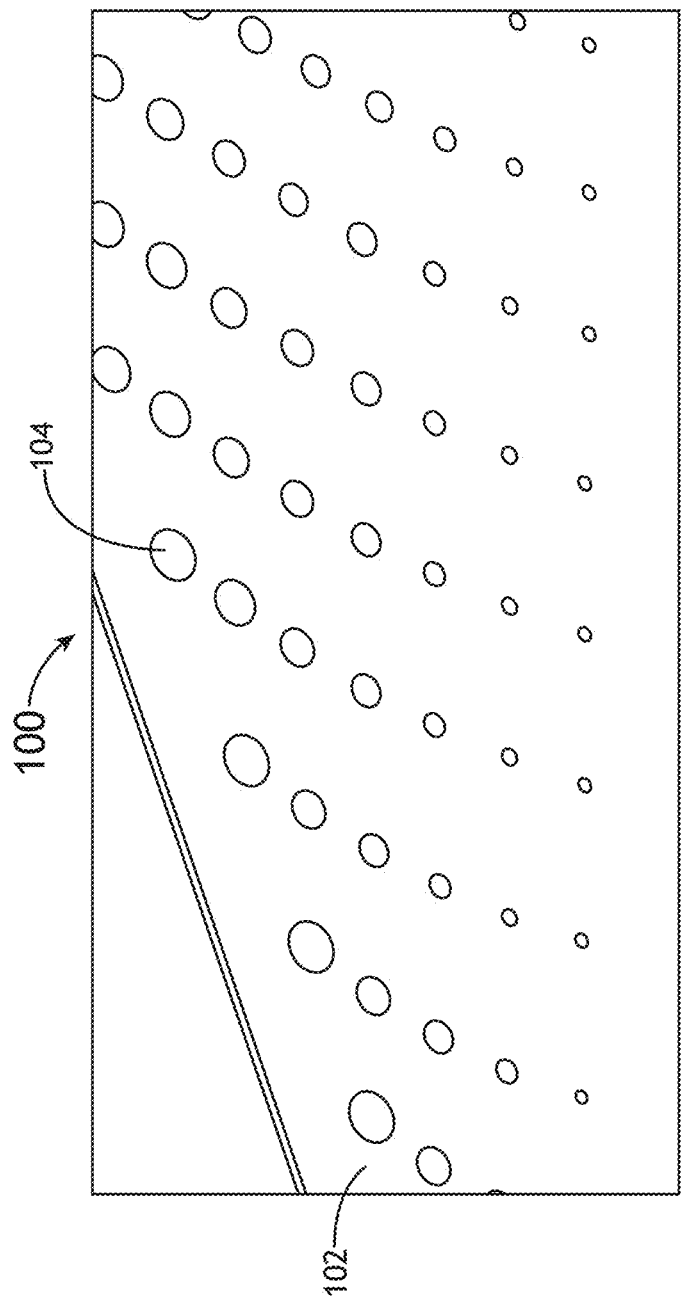
FIG. 1 is a perspective view of a portion of a backlit device, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A fire-retardant potting compound for a backlit device is disclosed. A backlit device may include a potting compound that protects portions of the device (e.g., electrical components) from liquid, dust, shock, vibrations, etc. The potting compound may also be used to achieve a more even light distribution. As previously noted herein, there is a need for potting compound formulations that meet thermal conductivity and fire-retardant requirements for critical applications. In embodiments, the disclosed fire-retardant potting compound satisfies the Federal Aviation Regulations (FAR) 25.8.53 test criteria. Accordingly, the fire-retardant potting compound can be used for backlit devices within an aircraft cabin.

FIG. 1 illustrates a portion of a backlit device 100 that includes a panel 102 (e.g., a metallic/non-metallic substrate) with one or more transmissive features 104 (e.g., openings and/or transparent/translucent regions) formed within the panel 102 or otherwise defined by the panel 102 structure. In some embodiments, the backlit device 100 may be a light fixture (e.g., a backlit wall/ceiling mounted structure, galley structure, aircraft cabin monument, passenger chair structure, reading light, indicator light, or the like). For example, the backlit device 100 may be any type of aircraft cabin lighting fixture. In other embodiments, the backlit device 100 may be a user interface device (e.g., a backlit switch, button, knob, keypad, keyboard, touch/proximity sensor, touchscreen, touch panel, or the like). For example, the backlit device 100 may be any type of onboard user interface device for use by passengers or flight crew onboard an aircraft.

Referring now to FIGS. 2A through 2D, the backlit device 100 includes a light source 108 configured to transmit illumination through the panel 102 via the one or more transmissive features 104. The light source 108 may include, but is not limited to, a light-emitting diode (LED), LED array, LED light strip, fluorescent bulb/tube, incandescent bulb, or the like.

Figure 2A:
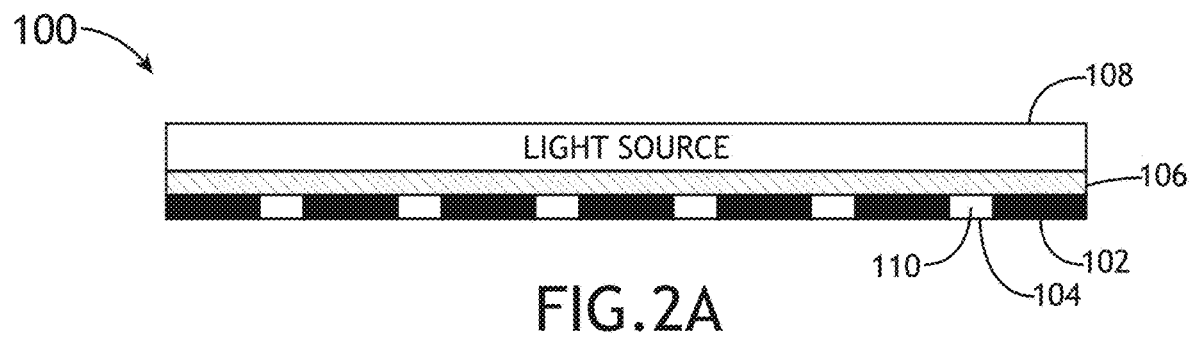
FIG. 2A is a cross-sectional view of a portion of a backlit device, in accordance with one or more embodiments of this disclosure.

In embodiments, a fire-retardant potting compound 106 is applied to the panel 102, in between the light source 108 and the one or more transmissive features 104 of the panel 102. For example, as shown in FIG. 2A, the fire-retardant potting compound 106 may be disposed in between the light source 108 and the panel 102 so that the fire-retardant potting compound 106 is in contact with the panel 102 and the light source 108. In some embodiments, the fire-retardant potting compound 106 may adhere or otherwise couple the light source 108 to the panel 102. In other embodiments, the fire-retardant potting compound 106 simply fills a gap between the light source 108 and the panel 102, thereby reducing vibrations, preventing shock, and/or protecting the light source 108 from liquid or debris that may enter from the front or sides of the panel 102.

Figure 2B:
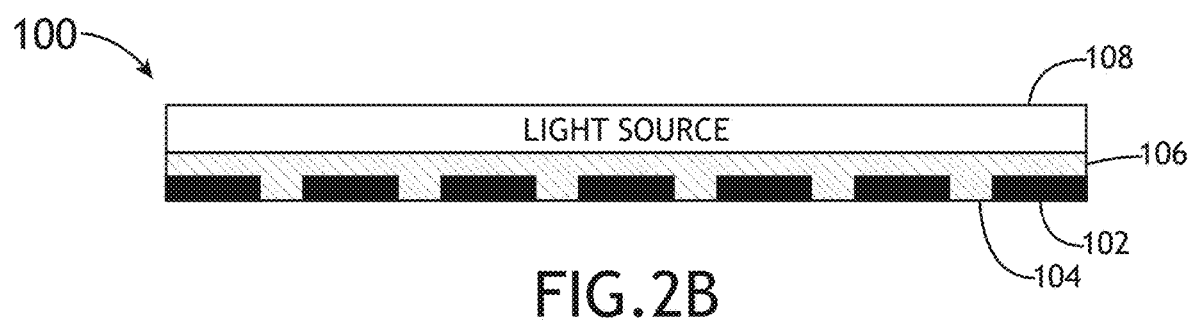
FIG. 2B is a cross-sectional view of a portion of a backlit device, in accordance with one or more embodiments of this disclosure.
Figure 2C:
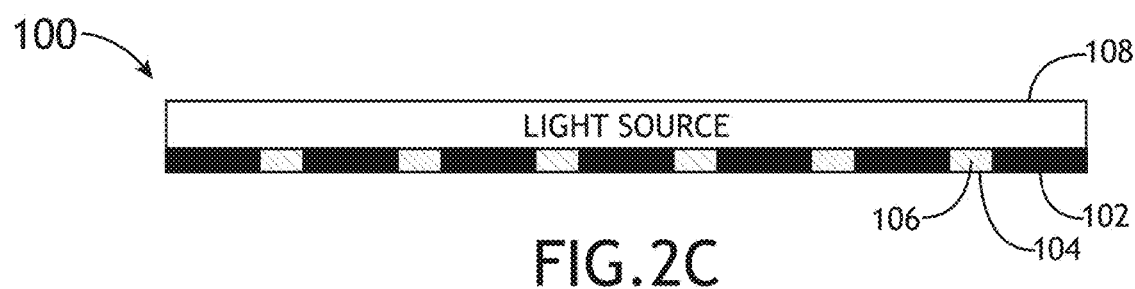
FIG. 2C is a cross-sectional view of a portion of a backlit device, in accordance with one or more embodiments of this disclosure.

As shown in FIG. 2B, the fire-retardant potting compound 106 may be applied across a surface of the panel 102 and may also be at least partially filled within the one or more transmissive features 104 (e.g., opening) that are defined within the panel 102. Alternatively, the fire-retardant potting compound 106 may be applied across a surface of the panel 102 but not within the one or more transmissive features 104 (e.g., as shown in FIG. 2A); or the fire-retardant potting compound 106 may only be disposed within the one or more transmissive features 104 that are defined within the panel 102 (e.g., as shown in FIG. 2C).

Figure 2D:
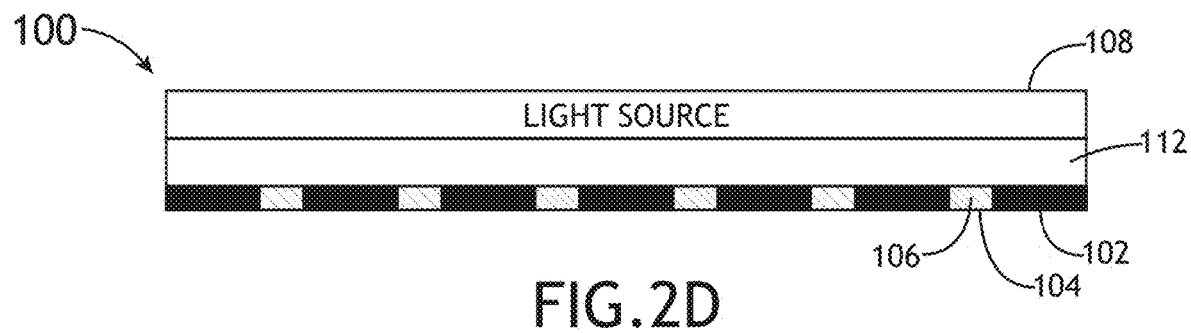
FIG. 2D is a cross-sectional view of a portion of a backlit device, in accordance with one or more embodiments of this disclosure.

In some embodiments, the backlit device 100 may include one or more air gaps. For example, as shown in FIG. 2A, the transmissive features 104 (e.g., openings) may include air gaps 110 if the transmissive features 104 are not filled with the fire-retardant potting compound 106 or any other transmissive material. As shown in FIG. 2D, in some embodiments, the backlit device 100 may include an air gap 112 between the light source 108 and the fire-retardant potting compound 106/panel 102.

Figure 3:
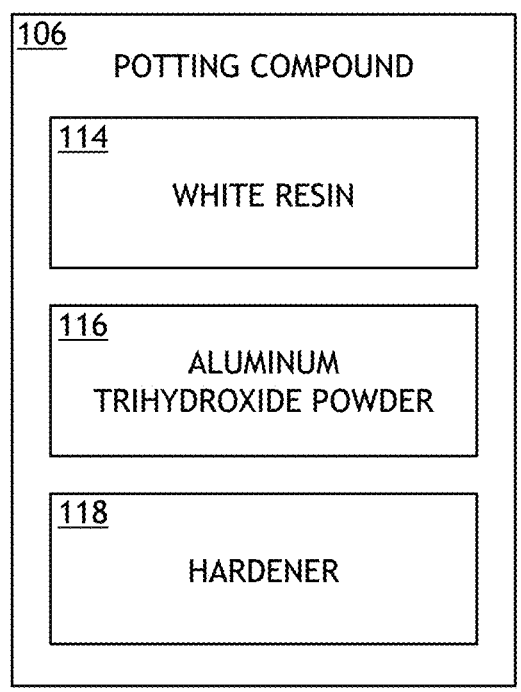
FIG. 3 is a block diagram illustrating a fire-retardant potting compound for a backlit device, in accordance with one or more embodiments of this disclosure.

Referring now to FIG. 3, the fire-retarding potting compound 106 includes a white resin 114 (e.g., OPTI-TEC 5001 white resin, or the like), an Aluminum Trihydroxide powder 116, and a hardener 118 (e.g., OPTI-TEC 5001 clear hardener, or the like) mixed together. In some embodiments, the white resin 114 constitutes approximately 30-35% of the fire-retardant potting compound by mass, the Aluminum Trihydroxide powder constitutes approximately 55-60% of the fire-retardant potting compound by mass, and the hardener constitutes approximately 5-10% of the fire-retardant potting compound by mass. For example, in an embodiment, the ratio of the three components is 8:15:2 or 32%:60%:8%, where the white resin constitutes approximately 32% of the fire-retardant potting compound by mass, the Aluminum Trihydroxide powder constitutes approximately 60% of the fire-retardant potting compound by mass, and the hardener constitutes approximately 8% of the fire-retardant potting compound by mass. The tolerance of the percentage of Aluminum Trihydroxide powder may be in the range of 60% +0% or −3% because deviations may result in a reduction in strength of the material or its fire-retardant properties.

Figure 4:
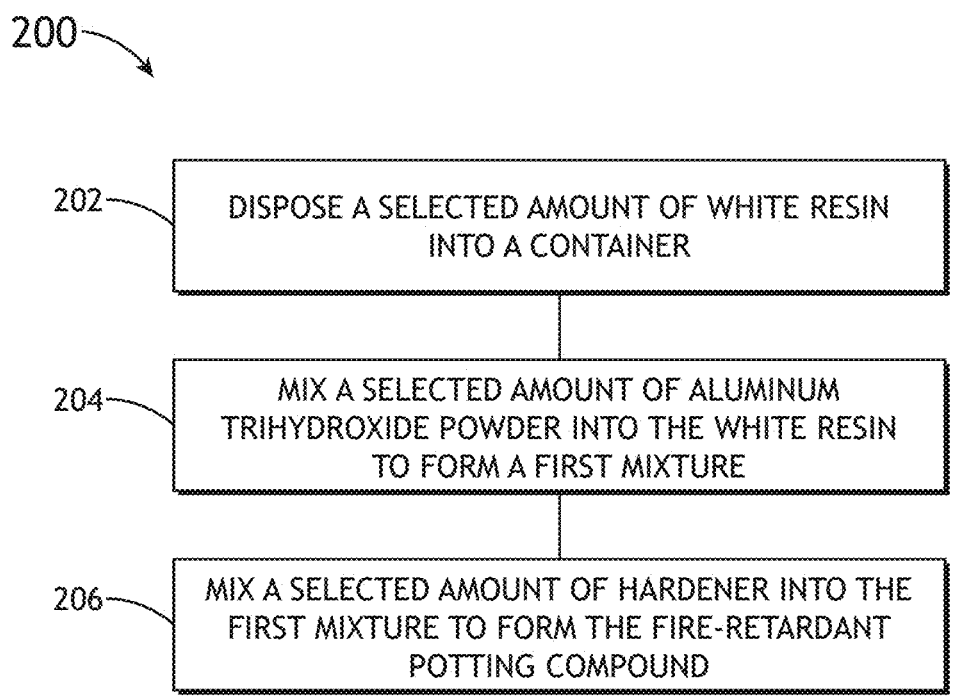
FIG. 4 is a flow diagram illustrating method of producing a fire-retardant potting compound for a backlit device, in accordance with one or more embodiments of this disclosure.

FIG. 4 is a flow diagram illustrating a method 200 of producing the fire-retardant potting compound 106, in accordance with one or more embodiments of this disclosure. In general, operations of disclosed processes (e.g., method 200) may be performed in an arbitrary order, unless otherwise provided in the claims.

At step 202, a selected amount of white resin 114 is disposed into a container (e.g., a measuring jug or any other vessel). In some embodiments, all components of the fire-retardant potting compound 106 may be measured by mass instead of volume. For example, the components may be measured utilizing a balanced and calibrated set of scales. The white resin 114 may be measured out into the container mechanically (e.g., using an automated fluid dispenser) or manually (e.g., by pouring the white resin 114 out of its container, using a manually actuated dispenser, or the like). As previously noted, the selected amount of white resin 114 may equate to approximately 30-35% (e.g., 32%) of the entire fire-retardant potting compound 106 mixture.

At step 204, a selected amount of Aluminum Trihydroxide powder 116 is mixed into the white resin 114 to form a first (intermediate) mixture. The Aluminum Trihydroxide powder 116 may be measured out into the container mechanically (e.g., using an automated powder dispenser) or manually (e.g., by scooping/pouring the Aluminum Trihydroxide powder 116 out of its container, using a manually actuated dispenser, or the like). As previously noted, the selected amount of Aluminum Trihydroxide powder 116 may equate to approximately 55-60% (e.g., 60%) of the entire fire-retardant potting compound 106 mixture.

The Aluminum Trihydroxide powder 116 may cause a slight color change when it is mixed into the white resin 114. In some embodiments, the first mixture is agitated (e.g., stirred or otherwise mixed) for at least two minutes before mixing the hardener 118 into the first mixture. For example, in some embodiments, the white resin 114 and the Aluminum Trihydroxide powder 116 may be stirred together gently with a spatula or any other stirrer for 2 to 3 minutes making sure that there are no lumps caused by the Aluminum Trihydroxide powder 116 or bubbles introduced into the mixture. The mixture may have a thickness similar to that of melted honey.

At step 206, a selected amount of hardener 118 is mixed into the first mixture (i.e., the white resin 114 and Aluminum Trihydroxide powder 116 mixture) to form the fire-retardant potting compound 106. The hardener 118 may be measured out into the container mechanically (e.g., using an automated fluid dispenser) or manually (e.g., by pouring the hardener 118 out of its container, using a manually actuated dispenser, or the like). As previously noted, the selected amount of hardener 118 may equate to approximately 5-10% (e.g., 8%) of the entire fire-retardant potting compound 106 mixture.

In some embodiments, the fire-retardant potting compound 106 mixture is agitated (e.g., stirred or otherwise mixed) for at least three minutes after mixing the hardener 118 into the mixture. For example, in some embodiments, the mixture including white resin 114, Aluminum Trihydroxide powder 116, and hardener 118 may be stirred together gently with a spatula or any other stirrer for 3 to 4 minutes making sure that no bubbles are introduced into the mixture. The final mixture may be a thick liquid/gel.

After the fire-retardant potting compound 106 is prepared, the fire-retardant potting compound 106 may be disposed within a syringe or any other dispenser ready for dispensing. Due to the consistency of the mixture, a wide needle syringe may be used when dispensing the fire-retardant potting compound 106. For example, the syringe may have a needle size may be approximately 2 mm wide or wider.

When applying the fire-retardant potting compound 106, the panel 102 may be set face down and potted from the back, ensuring that the potting compound does not flow out of channels on the rear face. In some embodiments, prior to applying the fire-retardant potting compound 106 to the panel 102, the front face of the panel 102 may be masked in sections using Kapton tape, ensuring that the tension is even across the tape to prevent ripples in the tape once applied to the front face of the panel 102 as this may result in lumps on the finished product. Once the tape has been applied, it may be rubbed down (e.g., using a cotton swab, or the like) to ensure that there are no leaks.

After the panel 102 has been potted with the fire-retardant potting compound 106, the panel 102 may be cured for a sufficient amount of time (e.g., 12 hours) in a clean dust-free environment at a temperature in the range of 45° C. to achieve a tack free finish.

It is to be understood that implementations of the methods disclosed herein may include one or more of the steps described herein. Further, such steps may be carried out in any desired order and two or more of the steps may be carried out simultaneously with one another. Two or more of the steps disclosed herein may be combined in a single step, and in some implementations, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A backlit device, comprising:
a panel with one or more transmissive features;
a light source configured to transmit illumination through the panel via the one or more transmissive features; and
a fire-retardant potting compound applied to the panel, in between the light source and the one or more transmissive features, the fire-retarding potting compound comprising an epoxy adhesive, an Aluminum Trihydroxide powder, and a hardener mixed together.

2. The backlit device of claim 1, wherein the epoxy adhesive constitutes approximately 30-35% of the fire-retardant potting compound by mass.

3. The backlit device of claim 2, wherein the Aluminum Trihydroxide powder constitutes approximately 55-60% of the fire-retardant potting compound by mass.

4. The backlit device of claim 3, wherein the hardener constitutes approximately 5-10% of the fire-retardant potting compound by mass.

5. The backlit device of claim 1, wherein the epoxy adhesive constitutes approximately 32% of the fire-retardant potting compound by mass, the Aluminum Trihydroxide powder constitutes approximately 60% of the fire-retardant potting compound by mass, and the hardener constitutes approximately 8% of the fire-retardant potting compound by mass.

6. The backlit device of claim 1, wherein the one or more transmissive features comprise one or more openings defined within the panel.

7. The backlit device of claim 1, wherein the backlit device comprises a light fixture.

8. The backlit device of claim 1, wherein the backlit device comprises a user interface device.

* * * * *